United States Patent
Park et al.

(10) Patent No.: US 8,029,876 B2
(45) Date of Patent: Oct. 4, 2011

(54) HEAT-CONDUCTIVE RESIN COMPOSITION AND PLASTIC ARTICLE INCLUDING THE SAME

(75) Inventors: Sun Ho Park, Uiwang-si (KR); Chang Min Hong, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 280 days.

(21) Appl. No.: 12/491,383

(22) Filed: Jun. 25, 2009

(65) Prior Publication Data

US 2009/0264570 A1 Oct. 22, 2009

Related U.S. Application Data

(63) Continuation-in-part of application No. PCT/KR2006/005853, filed on Dec. 28, 2006.

(30) Foreign Application Priority Data

Dec. 27, 2006 (KR) .................. 10-2006-0134980

(51) Int. Cl.
*C08L 101/12* (2006.01)

(52) U.S. Cl. .................. 428/1.1; 428/297.4; 428/301.4; 428/332; 428/339; 524/401; 524/404; 524/428; 524/437; 524/440; 524/441; 524/847

(58) Field of Classification Search .................. 524/401, 524/404, 428, 437, 439–441, 847; 428/1.1, 428/297.4, 301.4, 332, 339; 523/220
See application file for complete search history.

(56) References Cited

U.S. PATENT DOCUMENTS

| | | | | |
|---|---|---|---|---|
| 4,015,039 A | * | 3/1977 | Segal et al. | 442/381 |
| 6,627,689 B2 | | 9/2003 | Iino et al. | |
| 6,685,855 B1 | * | 2/2004 | Miller et al. | 264/1.1 |
| 6,827,470 B2 | * | 12/2004 | Sagal et al. | 362/341 |
| 6,976,769 B2 | * | 12/2005 | McCullough et al. | 362/345 |
| 7,309,727 B2 | * | 12/2007 | Elkovitch et al. | 524/449 |
| 7,476,702 B2 | * | 1/2009 | Sagal et al. | 524/404 |
| 2003/0181560 A1 | * | 9/2003 | Kawaguchi et al. | 524/424 |

FOREIGN PATENT DOCUMENTS

| | | |
|---|---|---|
| JP | 2001-151833 A | 6/2001 |
| JP | 2002-060639 A | 2/2002 |
| JP | 2003-176327 A | 6/2003 |
| JP | 2003-213137 A | 7/2003 |
| KR | 10-2003-0041004 A1 | 5/2003 |
| WO | 2008/078848 A1 | 7/2008 |

OTHER PUBLICATIONS

International Search Report in counterpart International Application No. PCT/KR2006/005853, mailed Sep. 17, 2007.

* cited by examiner

*Primary Examiner* — Susan W Berman

(74) *Attorney, Agent, or Firm* — Summa, Additon & Ashe, P.A.

(57) ABSTRACT

A thermal-conductive resin composition and a plastic article are provided. The thermal-conductive resin composition comprises about 30 to about 60% by weight of a thermoplastic resin and about 40 to about 70% by weight of a thermal-conductive filler comprising about 10% by weight or more of a thermal-conductive filler with a height-to-length ratio (length/height) of about 7,000 to about 40,000 and about 10% by weight or more of a thermal-conductive filler with a height-to-length ratio of about 10 to about 1,000.

6 Claims, No Drawings

HEAT-CONDUCTIVE RESIN COMPOSITION AND PLASTIC ARTICLE INCLUDING THE SAME

CROSS-REFERENCE TO RELATED APPLICATIONS

This non-provisional application is a continuation-in-part application of PCT Application No. PCT/KR2006/005853, filed Dec. 28, 2006, pending, which designates the U.S. and which is hereby incorporated by reference in its entirety, and claims priority therefrom under 35 USC Section 120. This application also claims priority under 35 USC Section 119 from Korean Patent Application No. 10-2006-0134980, filed Dec. 27, 2006, the entire disclosure of which is also hereby incorporated by reference.

FIELD OF THE INVENTION

The present invention relates to a thermal-conductive resin composition and a plastic article manufactured using the same.

BACKGROUND OF THE INVENTION

Metal has been the most frequently used material for a heat radiating member such as the main body, chassis or heat radiating plate of most electronic equipment having exothermic parts. This is because metal has high thermal conductivity such that it can diffuse heat more quickly to the surroundings than other materials so as to protect electronic parts that are sensitive to heat from local high-temperatures. Moreover, metal not only has high mechanical strength, but also has workability via plating, molding or cutting such that it can be appropriately used as a material for the heat radiating member which is apt to have a complex shape. However, metals have disadvantages such as their high density so that it is difficult to make the metal light weight, and the high unit price thereof.

Because of these disadvantages of metal, there has been a focus on thermal-conductive resin to replace metal as a material for heat radiating members. As a result, heat radiating members such as heat radiating sheets or heat radiating grease using a thermal-conductive resin have been used for printers, copying machines, notebook computers and the like.

Recently, as electronic equipment becomes highly integrated and efficient, more heat is generated in the electronic equipment. Moreover, as electronic equipment becomes thin-filmed and light-weight, it is even more difficult to diffuse heat generated in the electronic equipment to the surroundings. As a result, the local high-temperature state resulting from heat generated in the electronic equipment, which can lead to a malfunction or a fire, has increasingly become a problem. Therefore, a thermal-conductive resin having improved conductivity, for example a conductivity of 5 W/m·K or more, is demanded.

However, when increased amounts of thermal-conductive filler are added to a thermal-conductive resin to improve conductivity, the injection moldability of the thermal-conductive resin deteriorates so that the manufacture of a product using the same becomes more difficult. Furthermore, the mechanical strength of the thermal-conductive resin and a product manufactured using the same also deteriorates.

SUMMARY OF THE INVENTION

The present invention relates to a thermal-conductive resin composition with improved thermal conductivity as well as excellent mechanical strength and injection moldability, and to a plastic article manufactured using the same.

In accordance with one aspect of the invention, there is provided a thermal-conductive resin composition comprising about 30 to about 60% by weight of a thermoplastic resin and about 40 to about 70% by weight of a thermal-conductive filler comprising about 10% by weight or more of a thermal-conductive filler with a height-to-length ratio (length/height) of about 7,000 to about 40,000 and about 10% by weight or more of a thermal-conductive filler with a height-to-length ratio of about 10 to about 1,000.

In the thermal-conductive resin composition, the thermoplastic resin may include a polyethylene resin, a polypropylene resin, a polystyrene resin, a styrene-butadiene copolymer resin, a polyamide resin, a polycarbonate resin, a liquid crystal polymer resin, a polyvinylidene fluoride resin, polyphenylene sulfide resin, or a combination thereof.

In the thermal-conductive resin composition, the thermal-conductive filler may include aluminum nitride, boron nitride, carbon black, carbon fiber, carbon nanotube, graphite metallic fillers, or a combination thereof.

Furthermore, in the thermal-conductive resin composition, the volume of the thermal-conductive filler may be about 60% or less of the total volume of the thermal-conductive resin composition.

In accordance with another aspect of the invention, there is provided a plastic article which is manufactured using the thermal-conductive resin composition.

In accordance with yet another aspect of the invention, there is provided a plastic article comprising a thermoplastic resin substrate and a thermal-conductive filler dispersed in the thermoplastic resin substrate, wherein the thermal-conductive filler comprises a thermal-conductive filler with a height-to-length ratio of about 7,000 to about 40,000 and a thermal-conductive filler with a height-to-length ratio of about 10 to about 1,000.

Other specific embodiments to carry out the invention are included in the following detailed description.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

In accordance with one embodiment of the invention, there is provided a thermal-conductive resin composition comprising about 30 to about 60% by weight of a thermoplastic resin and about 40 to about 70% by weight of a thermal-conductive filler comprising about 10% by weight or more of a thermal-conductive filler with a height-to-length ratio (length/height) of about 7,000 to about 40,000 and about 10% by weight or more of a thermal-conductive filler with a height-to-length ratio of about 10 to about 1,000.

Throughout the present specification, the term, "height-to-length ratio" is defined as a value of the length divided by the height (thickness) of a thermal-conductive filler. For example, in the case of a thermal-conductive filler having a laminated plate structure of one to several tens of laminae, irregular rotational ellipsoids or needle-shaped plates (e.g. graphite), a value of the length divided by the thickness of the laminated plate structure can be defined as the "height-to-length ratio." Therefore, the "height-to-length ratio" increases as the length of the laminated plate structure is longer and the thickness of the laminated plate structure is thinner.

Meanwhile, thermal conductivity of a thermal-conductive resin is proportional to the surface area of a thermal-conductive filler contained in the thermal-conductive resin. That is, the larger the surface area of a thermal-conductive filler, the more heat contacts the thermal-conductive filler so as to transfer heat quickly, thus the thermal conductivity of the thermal-conductive resin can improve.

The surface area is reduced as the shape of a thermal-conductive filler becomes close to a sphere at a constant mass, whereas it increases as the filler has a shape elongated to one side (that is, as the height-to-length ratio becomes larger) like a thread.

Thus, in the thermal-conductive resin composition, including a thermal-conductive filler having such a large height-to-length ratio of about 7,000 to about 40,000 can significantly increase the surface area of the thermal-conductive filler in the thermal-conductive resin such that the thermal conductivity of the thermal-conductive resin can improve without increasing the content (amount) of the thermal-conductive filler. Therefore, the thermal conductivity of the thermal-conductive resin can improve even more, without lowering the mechanical strength or injection moldability, by increasing the content of the thermal-conductive filler.

Furthermore, the thermal-conductive resin composition includes a thermal-conductive filler having a relatively small height-to-length ratio of about 10 to about 1,000, in addition to the thermal-conductive filler having the height-to-length ratio of about 7,000 to about 40,000. As a result of the research carried out by the present inventors, it was found that there is a limitation to improving the thermal conductivity while maintaining injection moldability and mechanical strength of a thermal-conductive resin, when a thermal-conductive resin composition contains only the thermal-conductive filler having such a large height-to-length ratio of about 7,000 to about 40,000. Therefore, by including a thermal-conductive filler having a relatively small height-to-length ratio of about 10 to about 1,000 in the thermal-conductive resin composition, the thermal conductivity can improve even more, while maintaining excellent injection moldability and mechanical strength of the thermal-conductive resin.

Therefore, using the thermally-conductive resin composition, a thermally-conductive resin having excellent injection moldability, mechanical strength, and even more improved thermal conductivity, for example, thermal conductivity of about 5 W/m·K or more, can be provided.

The components of the thermal-conductive resin composition are described in detail as follows.

The thermal-conductive resin composition comprises a thermoplastic resin.

Any thermoplastic resin capable of extrusion or injection molding can be used as the thermoplastic resin, including without limitation conventional thermoplastic and engineering resins. Exemplary thermoplastic resins include without limitation polyethylene resin, polypropylene resin, polystyrene resin, styrene-butadiene copolymer resin, polyamide resin, polycarbonate resin, liquid crystal polymer resin, polyvinylidene fluoride resin, polyphenylene sulfide resin, copolymers thereof, or combinations of two or more selected therefrom.

The thermoplastic resins can include conventional components and can be prepared using methods known in the art.

The thermal-conductive resin composition includes the thermoplastic resin in an amount of about 30 to about 60% by weight. When the content of the thermoplastic resin is less than about 30% by weight, mechanical strength and injection moldability of the thermal-conductive resin may deteriorate. When the content of the thermoplastic resin exceeds about 60% by weight, the content of the thermal-conductive filler excluding the thermoplastic resin is reduced, thus the thermal conductivity of the thermal-conductive resin may deteriorate.

The thermal-conductive resin composition also comprises a thermal-conductive filler comprising a thermal-conductive filler with a height-to-length ratio of about 7,000 to about 40,000 and a thermal-conductive filler with a height-to-length ratio of about 10 to about 1,000.

As described above, the thermal conductivity of the thermal-conductive resin can improve even more by including a predetermined thermal-conductive filler containing two types of thermal-conductive filler having predetermined height-to-length ratios in the thermal-conductive resin composition, in which the surface area of the thermal-conductive filler increases without deteriorating the injection moldability or the mechanical strength due to excessive amount of the thermal-conductive filler.

Examples of such thermal-conductive filler include without limitation aluminum nitride, boron nitride, carbon black, carbon fiber, carbon nanotube, graphite, metallic fillers, or the like, or combinations thereof. Furthermore, other typical thermal-conductive fillers can be used without limitation.

Among the above-mentioned thermal-conductive fillers, graphite can have excellent filling capability and thermal conductivity.

Such graphite can have a laminated plate structure of one to several tens of irregular rotational ellipsoids or needle-shaped plates. Because the graphite has anisotropy in thermal conductivity, the thermal conductivity in the length direction of the plate-shaped graphite is higher than thermal conductivity in the thickness direction of the plate-shaped graphite. Therefore, for example, by using the graphite having a height-to-length ratio of about 7,000 to about 40,000 as a thermal-conductive filler, the thermal conductivity of the thermal-conductive resin can improve even more.

The graphite can be classified into two types such as a natural graphite and an artificial graphite, and these two types of graphite can both be used as the thermal-conductive filler.

The thermal-conductive filler may contain thermal-conductive fillers with various height-to-length ratios in addition to the above two types of thermal-conductive fillers, i.e., the thermal-conductive filler with the height-to-length ratio of about 7,000 to about 40,000 and the thermal-conductive filler with the height-to-length ratio of about 10 to about 1,000.

The thermal-conductive filler contains the two types of thermal-conductive fillers in an amount of about 10% by weight or more, respectively. In the case where the two types of thermal-conductive fillers comprise less than about 10% by weight, it is difficult to obtain the effects from adding these thermal-conductive fillers. That is, it is difficult to obtain the improved thermal conductivity while maintaining excellent injection moldability and mechanical strength of the thermal-conductive resin.

The thermal-conductive resin composition includes the thermal-conductive filler containing the two types of thermal-conductive fillers in an amount of about 40 to about 70% by weight. When the content of the thermal-conductive filler is less than about 40% by weight, the thermal conductivity of the thermal-conductive resin may be insufficient. Further, when the content exceeds about 70% by weight, mechanical strength and injection moldability of the thermal-conductive resin may deteriorate.

Furthermore, the volume of the thermal-conductive filler containing the two types of thermal-conductive fillers can be about 60% or less of the total volume of the thermal-conductive resin composition. Thereby, deterioration of injection moldability and mechanical strength of the thermal-conductive resin due to excessive addition of the thermal-conductive filler can be prevented.

The thermal-conductive resin composition may further comprise additives as appropriate for a particular purpose or use, in addition to the above-mentioned constitutional components.

A thermal-conductive resin or a plastic article can be manufactured by preparing the thermal-conductive resin composition by mixing the above-mentioned constitutional components and by using a typical method such as melt extruding the thermal-conductive resin composition through an extruding machine.

In accordance with another embodiment of the invention, there is provided a plastic article manufactured using the thermal-conductive resin composition. Such a plastic article may comprise, for example, a thermoplastic resin substrate and a thermal-conductive filler dispersed in the thermoplastic resin substrate, wherein the thermal-conductive filler comprises a thermal-conductive filler with a height-to-length ratio of about 7,000 to about 40,000 and a thermal-conductive filler with a height-to-length ratio of about 10 to about 1,000.

That is, because the thermal-conductive filler containing the two types of thermal-conductive fillers are dispersed homogeneously in the resin substrate, the plastic article may exhibit improved thermal conductivity without containing an excessive amount of the thermal-conductive filler, and because an excessive amount of the thermal-conductive filler is not included, excellent injection moldability and mechanical strength can be exhibited.

Therefore, the plastic article can be appropriately used in heat radiating members such as a heat radiating sheet or a heat radiating grease of various electronic equipment.

Hereinafter, components and functions of the invention will be explained in greater detail with reference to the following examples. However, these examples are given for the purpose of illustration and not to be construed as limiting the scope of the invention.

EXAMPLE 1

30% by weight of polyphenylene sulfide resin (manufactured by Chevron-Phillips Chemical Company LLC; Ryton® PPS) as a thermoplastic resin, and 40% by weight of graphite with a height-to-length ratio of 7,000 to 40,000 and 30% by weight of graphite with a height-to-length ratio of 10 to 1,000 as a thermal-conductive filler are mixed to prepare a thermal-conductive resin composition. The thermal-conductive resin composition is extruded and injected to prepare samples for measuring various physical properties.

EXAMPLE 2

35% by weight of polyphenylene sulfide resin (manufactured by Chevron-Phillips Chemical Company LLC; Ryton® PPS) as a thermoplastic resin, and 30% by weight of graphite with a height-to-length ratio of 7,000 to 40,000 and 35% by weight of graphite with a height-to-length ratio of 10 to 1,000 as a thermal-conductive filler are mixed to prepare a thermal-conductive resin composition. The thermal-conductive resin composition is extruded and injected to prepare samples for measuring various physical properties.

EXAMPLE 3

40% by weight of polyphenylene sulfide resin (manufactured by Chevron-Phillips Chemical Company LLC; Ryton® PPS) as a thermoplastic resin, and 10% by weight of graphite with a height-to-length ratio of 7,000 to 40,000 and 50% by weight of graphite with a height-to-length ratio of 10 to 1,000 as a thermal-conductive filler are mixed to prepare a thermal-conductive resin composition. The thermal-conductive resin composition is extruded and injected to prepare samples for measuring various physical properties.

EXAMPLE 4

40% by weight of polyphenylene sulfide resin (manufactured by Chevron-Phillips Chemical Company LLC; Ryton® PPS) as a thermoplastic resin, and 30% by weight of graphite with a height-to-length ratio of 7,000 to 40,000 and 30% by weight of graphite with a height-to-length ratio of 10 to 1,000 as a thermal-conductive filler are mixed to prepare a thermal-conductive resin composition. The thermal-conductive resin composition is extruded and injected to prepare samples for measuring various physical properties.

EXAMPLE 5

50% by weight of polyphenylene sulfide resin (manufactured by Chevron-Phillips Chemical Company LLC; Ryton® PPS) as a thermoplastic resin, and 40% by weight of graphite with a height-to-length ratio of 7,000 to 40,000 and 10% by weight of graphite with a height-to-length ratio of 10 to 1,000 as a thermal-conductive filler are mixed to prepare a thermal-conductive resin composition. The thermal-conductive resin composition is extruded and injected to prepare samples for measuring various physical properties.

COMPARATIVE EXAMPLE 1

25% by weight of polyphenylene sulfide resin (manufactured by Chevron-Phillips Chemical Company LLC; Ryton® PPS) as a thermoplastic resin, and 45% by weight of graphite with a height-to-length ratio of 7,000 to 40,000 and 30% by weight of graphite with a height-to-length ratio of 10 to 1,000 as a thermal-conductive filler are mixed to prepare a thermal-conductive resin composition. The thermal-conductive resin composition is extruded and injected to prepare samples for measuring various physical properties.

COMPARATIVE EXAMPLE 2

40% by weight of polyphenylene sulfide resin (manufactured by Chevron-Phillips Chemical Company LLC; Ryton® PPS) as a thermoplastic resin, and 60% by weight of graphite with a height-to-length ratio of 10 to 1,000 as a thermal-conductive filler are mixed to prepare a thermal-conductive resin composition. The thermal-conductive resin composition is extruded and injected to prepare samples for measuring various physical properties.

COMPARATIVE EXAMPLE 3

40% by weight of polyphenylene sulfide resin (manufactured by Chevron-Phillips Chemical Company LLC; Ryton® PPS) as a thermoplastic resin, and 60% by weight of graphite with a height-to-length ratio of 7,000 to 40,000 as a thermal-conductive filler are mixed to prepare a thermal-conductive resin composition. The thermal-conductive resin composition is extruded and injected to prepare samples for measuring various physical properties.

COMPARATIVE EXAMPLE 4

65% by weight of polyphenylene sulfide resin (manufactured by Chevron-Phillips Chemical Company LLC; Ryton® PPS) as a thermoplastic resin, and 25% by weight of graphite with a height-to-length ratio of 7,000 to 40,000 and 10% by weight of graphite with a height-to-length ratio of 10 to 1,000 as a thermal-conductive filler are mixed to prepare a thermal-conductive resin composition. The thermal-conductive resin composition is extruded and injected to prepare samples for measuring various physical properties.

Physical properties of the samples prepared in the Examples and Comparative Examples are measured by the following methods.

Thermal conductivity of each sample is measured based on ASTM E 1530, which is a standard test method in the United States (evaluation of the thermal conductivity).

Electric conductivity of each sample is measured based on ASTM D 257, which is a standard test method in the United States (evaluation of the electric conductivity).

Flexural strength of each sample is measured based on ASTM D 790, which is a standard test method in the United States (evaluation of the mechanical strength).

Injection moldability of each thermal-conductive resin composition is evaluated during the injection process for preparing samples in the Examples and Comparative Examples.

The results of these physical properties are listed in the following Table 1.

TABLE 1

| | Thermal conductivity (W/m · K) | Electric conductivity (S/cm) | Flexural strength (MPa) | PPS (wt %) | Height-to-length ratio of thermal-conductive filler - 7,000 to 40,000 (wt %) | Height-to-length ratio of thermal-conductive filler - 10 to 1,000 (wt %) | Total volume of thermal-conductive filler (v %) |
|---|---|---|---|---|---|---|---|
| Example 1 | 25.4 | 18.9 | 85 | 30 | 40 | 30 | 58.0 |
| Example 2 | 11.8 | 3.9 | 92 | 35 | 30 | 35 | 52.3 |
| Example 3 | 5.3 | 2.2 | 110 | 40 | 10 | 50 | 47.0 |
| Example 4 | 10.3 | 6.1 | 95 | 40 | 30 | 30 | 47.0 |
| Example 5 | 6.6 | 12.4 | 121 | 50 | 40 | 10 | 37.2 |
| Comparative Example 1 | 31.8 | 46.3 | 43 | 25 | 45 | 30 | 63.9 |
| Comparative Example 2 | 3.5 | 1.4 | 87 | 40 | — | 60 | 47.0 |
| Comparative Example 3 | 4.9 | 20.3 | 85 | 40 | 60 | — | 47.0 |
| Comparative Example 4 | 2.1 | 1.9 | 126 | 65 | 25 | 10 | 24.1 |

With reference to Table 1, Examples 1 to 5 including the thermal-conductive resin and the two types of thermal-conductive fillers in the amounts of the invention have excellent thermal conductivity, for example, 5 W/m·K, and mechanical strength. Also, Examples 1 to 5 have excellent injection moldability.

In contrast, Comparative Example 1 including the thermal conductivity filler in an amount exceeding 70% by weight has excellent thermal conductivity, but low mechanical strength and also has unsatisfactory injection moldability.

Furthermore, Comparative Examples 2 and 3 including only one type of thermal-conductive filler have low thermal conductivity and low mechanical strength as compared with Examples 3 and 4 with the same content of the thermal-conductive filler. Moreover, Comparative Example 3 cannot be appropriately used as a heat radiating member for various electronic equipment because of its high electric conductivity.

Finally, Comparative Example 4 including less than 40% by weight of a thermal-conductive filler has low thermal conductivity.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. A thermal-conductive resin composition comprising: about 30 to about 60% by weight of a thermoplastic resin; and
about 40 to about 70% by weight of a thermal-conductive filler comprising about 10% by weight or more of a thermal-conductive filler with a height-to-length ratio (length/height) of about 7,000 to about 40,000 and about 10% by weight or more of a thermal-conductive filler with a height-to-length ratio of about 10 to about 1,000.

2. The composition according to claim 1, wherein the thermoplastic resin comprises a polyethylene resin, a polypropylene resin, a polystyrene resin, a styrene-butadiene copolymer resin, a polyamide resin, a polycarbonate resin, a liquid crystal polymer resin, a polyvinylidene fluoride resin, polyphenylene sulfide resin, or a combination thereof.

3. The composition according to claim 1, wherein the thermal-conductive filler comprises aluminum nitride, boron nitride, carbon black, graphite, metallic fillers, or a combination thereof.

4. The composition according to claim 1, wherein the volume of the thermal-conductive filler is about 60% or less of the total volume of the thermal-conductive resin composition.

5. A plastic article, which is manufactured using the thermal-conductive resin composition according to claim 1.

6. A plastic article comprising:
a thermoplastic resin substrate; and
a thermal-conductive filler dispersed in the thermoplastic resin substrate, wherein the thermal-conductive filler comprises a thermal-conductive filler with a height-to-length ratio of about 7,000 to about 40,000 and a thermal-conductive filler with a height-to-length ratio of about 10 to about 1,000.

* * * * *